US009485762B2

(12) United States Patent
Lee

(10) Patent No.: US 9,485,762 B2
(45) Date of Patent: Nov. 1, 2016

(54) APPARATUSES FOR TRANSMITTING UPLINK CONTROL INFORMATION

(71) Applicant: Industrial Technology Research Institute, Zhudong Township, Hsinchu County (TW)

(72) Inventor: Chien-Min Lee, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 257 days.

(21) Appl. No.: 14/230,849

(22) Filed: Mar. 31, 2014

(65) Prior Publication Data

US 2014/0293907 A1   Oct. 2, 2014

Related U.S. Application Data

(60) Provisional application No. 61/806,946, filed on Apr. 1, 2013.

(51) Int. Cl.
*H04W 72/04* (2009.01)
*H04L 5/00* (2006.01)

(52) U.S. Cl.
CPC .......... *H04W 72/042* (2013.01); *H04L 5/0053* (2013.01); *H04L 5/0096* (2013.01)

(58) Field of Classification Search
CPC . H04L 5/0096; H04L 5/0053; H04W 72/042
USPC ....... 370/310, 315, 316, 319, 321, 322, 328, 370/329, 345, 347, 348, 431, 432, 437, 464, 370/465; 455/403, 422.1, 450, 452.1
See application file for complete search history.

(56) References Cited

U.S. PATENT DOCUMENTS

2010/0177694 A1\* 7/2010 Yang ............................. 370/328
2012/0039252 A1   2/2012 Damnjanovic et al.
(Continued)

FOREIGN PATENT DOCUMENTS

EP         2 557 878 A1      2/2013
WO    WO 2012/096431 A1     7/2012
WO    WO 2012/167431 A1    12/2012

OTHER PUBLICATIONS

LTE; Evolved Universal Terrestrial Radio Access (E-UTRA); Radio Resource Control (RRC); Protocol specification (3GPP TS 36.331 version 9.13.0 Release 9), Technical Specification, ETSI TS 136 331, V9.13.0 (Feb. 2013), cover page, pp. 1-15, pp. 118-121, and pp. 158-163, XP014156769, France.
(Continued)

*Primary Examiner* — Obaidul Huq
(74) *Attorney, Agent, or Firm* — Winston Hsu; Scott Margo

(57) ABSTRACT

A communication device includes a receiving circuit, an uplink control information generating circuit, a transmitting circuit and a control circuit. The receiving circuit receives an uplink-downlink reconfiguration message from a communication station. The uplink control information generating circuit generates a plurality of uplink control information. The transmitting circuit transmits the uplink control information in a plurality of data frames, each of which comprises a plurality of subframes. The control circuit determines the subframe of the data frame to be an uplink subframe, a downlink subframe or a special subframe according to the uplink-downlink reconfiguration message. The uplink-downlink reconfiguration message configures the communication device to operate in one of valid uplink-downlink configurations. The control circuit configures the transmitting circuit to transmit the uplink control information in a subframe of the data frame, which is not configured to be the downlink subframe in the valid uplink-downlink configurations.

14 Claims, 7 Drawing Sheets

(56) References Cited

U.S. PATENT DOCUMENTS

2012/0106460 A1* 5/2012 Yang .............................. 370/328
2012/0294153 A1 11/2012 Lee
2014/0092794 A1* 4/2014 Yang .............................. 370/280

OTHER PUBLICATIONS

3rd Generation Partnership Project; Technical Specification Group Radio Access Network; Evolved Universal Terrestrial Radio Access (E-UTRA); Further enhancements to LTE Time Division Duplex (TDD) for Downlink-Uplink (DL-UL) interference management and traffic adaptation (Release 11), Technical Report, 3GPP TR 36.828, V11.0.0 (Jun. 2012), XP050906266, pp. 1-6 and pp. 99-102, France.

LTE; Evolved Universal Terrestrial Radio Access (E-UTRA); Physical layer procedures (3GPP TS 36.213 version 11.1.0 Release 11), Technical Specification, ETSI TS 136 213, V11.1.0 (Feb. 2013), cover page, pp. 1-7, and pp. 100-103, XP014156735, France.

* cited by examiner

| UL-DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

FIG. 2

| UL HARQ reference UL-DL configuration | DL HARQ reference UL-DL configuration | Valid UL-DL configuration in reconfiguration DCI |
|---|---|---|
| 0 | 2 | 0, 1, 2, 6 |
| 0 | 4 | 0, 1, 3, 4, 6 |
| 0 | 5 | 0, 1, 2, 3, 4, 5, 6 |
| 1 | 2 | 1, 2 |
| 1 | 4 | 1, 4 |
| 1 | 5 | 1, 2, 4, 5 |
| 2 | 5 | 2, 5 |
| 3 | 4 | 3, 4 |
| 3 | 5 | 3, 4, 5 |
| 4 | 5 | 4, 5 |
| 6 | 2 | 1, 2, 6 |
| 6 | 4 | 1, 3, 4, 6 |
| 6 | 5 | 1, 2, 3, 4, 5, 6 |

FIG. 3

| Frame | RI (Set 1) → 400 | WB CQI/PMI (Set 1) → 401 | WB CQI/PMI (Set 2) → 402 | SB CQI BP 1 (Set 1) → 403 | SB CQI BP 1 (Set 2) → 404 | SB CQI BP 2 (Set 1) → 405 | SB CQI BP 2 (Set 2) → 406 | SB CQI BP 3 (Set 1) → 407 | SB CQI BP 3 (Set 2) → 408 | SB CQI BP 4 (Set 1) → 409 |

| Frame | RI (Set 2) → 410 | WB CQI/PMI (Set 1) → 411 | WB CQI/PMI (Set 2) → 412 | SB CQI BP 1 (Set 1) → 413 | SB CQI BP 1 (Set 2) → 414 | SB CQI BP 2 (Set 1) → 415 | SB CQI BP 2 (Set 2) → 416 | SB CQI BP 3 (Set 1) → 417 | SB CQI BP 3 (Set 2) → 418 | SB CQI BP 4 (Set 1) → 419 |

| Frame | RI (Set 1) → 420 | ...

FIG. 4

APPARATUSES FOR TRANSMITTING UPLINK CONTROL INFORMATION

CROSS-REFERENCE TO RELATED APPLICATIONS

This application claims the benefit of priority to U.S. Provisional Application Ser. No. 61/806,946, filed on Apr. 1, 2013; the entirety of which is incorporated herein by reference for all purposes.

BACKGROUND

The disclosure generally relates to a communication system and, more particularly, to transmissions of uplink control information in a communication system.

In the mobile communication system, the user equipment (UE) needs to report multiple types of information to the base stations for enhancing the communication quality. For example, in the 3rd Generation Partnership Project (3GPP) specification, the UE may report, the sounding reference signal (SRS) and several types of uplink control information (UCI), e.g., the channel status information (CSI) and the scheduling request (SR).

Other techniques are also utilized in the advanced communication standards for further improving the communication performance. For example, by utilizing the traffic adaptation mechanism, the base station may utilize the data frame with a suitable uplink-downlink (UL-DL) configuration for flexibly adjusting the subframes used for uplink and downlink services.

For a time division duplexing (TDD) communication system, the UL-DL configuration of the legacy UE may be changed according to the system information transmitted by the base station, e.g., the System Information Block Type 1 (SIB1) transmitted by the evolved NB (eNB) in 3GPP long-term evolution (LTE) system. In the 3GPP LTE system, the minimum period of transmitting the SIB1 is usually long (e.g., 640 ms) and the legacy UE may only change the UL-DL configuration with a time equal to or longer than the minimum period of transmitting the SIB1. This semi-static resource allocation may not adapt to fast varying traffic characteristics and environments of the communication channels, and the system performance may be seriously deteriorated.

Thus, dynamically allocating the UL-DL configuration with a shorter period (e.g., less than 640 ms of the minimum period of transmitting the SIB1) is proposed for improving the system performance. Other problems, however, arise accompanied with the newly adopted techniques. For example, when the traffic adaptation mechanism is utilized, the UE may need to timely and frequently report the UCI so that the base station may have better understanding about the situation of the communication channels. The uplink resources are often limited and traditional UCI reporting mechanisms therefore cannot handle with the rapidly changing situation of the communication channels. Especially, the problem is more complicated when smaller ranged base stations are adopted, e.g., microcell base stations and femtocell base stations.

SUMMARY

In view of the foregoing, it may be appreciated that a substantial need exists for methods and apparatuses that mitigate or reduce the problems above.

An example embodiment of a communication device is disclosed, comprising: a receiving circuit configured to operably receive an uplink-downlink (UL-DL) reconfiguration message from a communication station; an uplink control information generating circuit configured to operably generate a plurality of uplink control information (UCI); a transmitting circuit configured to operably transmit the UCI in a plurality of data frames, wherein each of the data frames comprises a plurality of subframes; and a control circuit configured to operably determine the subframes of the data frame to be an uplink subframe, a downlink subframe or a special subframe according to the UL-DL reconfiguration message; wherein the UL-DL reconfiguration message configures the communication device to operate in one of a plurality of valid UL-DL configurations; a first subframe of the subframe of the data frame is not configured to be the downlink subframe in the valid UL-DL configurations; and the control circuit configures the transmitting circuit to transmit the UCI in the first subframes of the data frames.

An example embodiment of a communication station is disclosed, configured to operably communicate with a communication device, comprising: a control circuit configured to operably generate an uplink-downlink (UL-DL) reconfiguration message for configuring a UL-DL configuration of the communication device; a transmitting circuit configured to operably transmit the UL-DL reconfiguration message to the communication device; and a receiving circuit configured to operably receive uplink control information (UCI) transmitted by the communication device; wherein the UCI is transmitted in a plurality of data frames and each of the data frames comprises a plurality of subframes; the subframe of the data frame is configured to be an uplink subframe, a downlink subframe or a special subframe according to the UL-DL reconfiguration message; the UL-DL reconfiguration message configures the communication device to operate in one of a plurality of valid UL-DL configurations; a first subframe of the subframes of the data frame is not configured to be the downlink subframe in the valid UL-DL configurations; and the receiving circuit receives the UCI in the first subframes of the data frames.

Both the foregoing general description and the following detailed description are examples and explanatory only, and are not restrictive of the invention as claimed.

BRIEF DESCRIPTION OF THE DRAWINGS

FIG. 2 shows a simplified schematic of the UL-DL resource assignments in different UL-DL configurations according to one embodiment of the present disclosure.

FIG. 3 shows a simplified schematic of valid UL-DL configurations in reconfiguration downlink control information according to one embodiment of the present disclosure FIG. 4 shows a simplified schematic of the UCI transmission according to one embodiment of the present disclosure.

DETAILED DESCRIPTION

Reference is made in detail to embodiments of the invention, which are illustrated in the accompanying drawings. The same reference numbers may be used throughout the drawings to refer to the same or like parts, components, or operations.

In the following description, a 3rd Generation Partnership Project (3GPP) communication system is utilized as examples. People skilled in the art may appreciate the present invention may also be applicable for other communication systems from consideration of the specification and practice of the invention disclosed herein. Moreover, the sounding reference signal (SRS) and the uplink control information (UCI), e.g., the channel status information (CSI) and the scheduling request (SR) in the 3GPP specification may be transmitted according to the embodiments disclosed herein. Although it is different from the definitions in the 3GPP specification, the sounding reference signal, the channel status information and the scheduling request are collectively referred to as the uplink control information (UCI) for concisely explaining the embodiments below.

Figure 1:
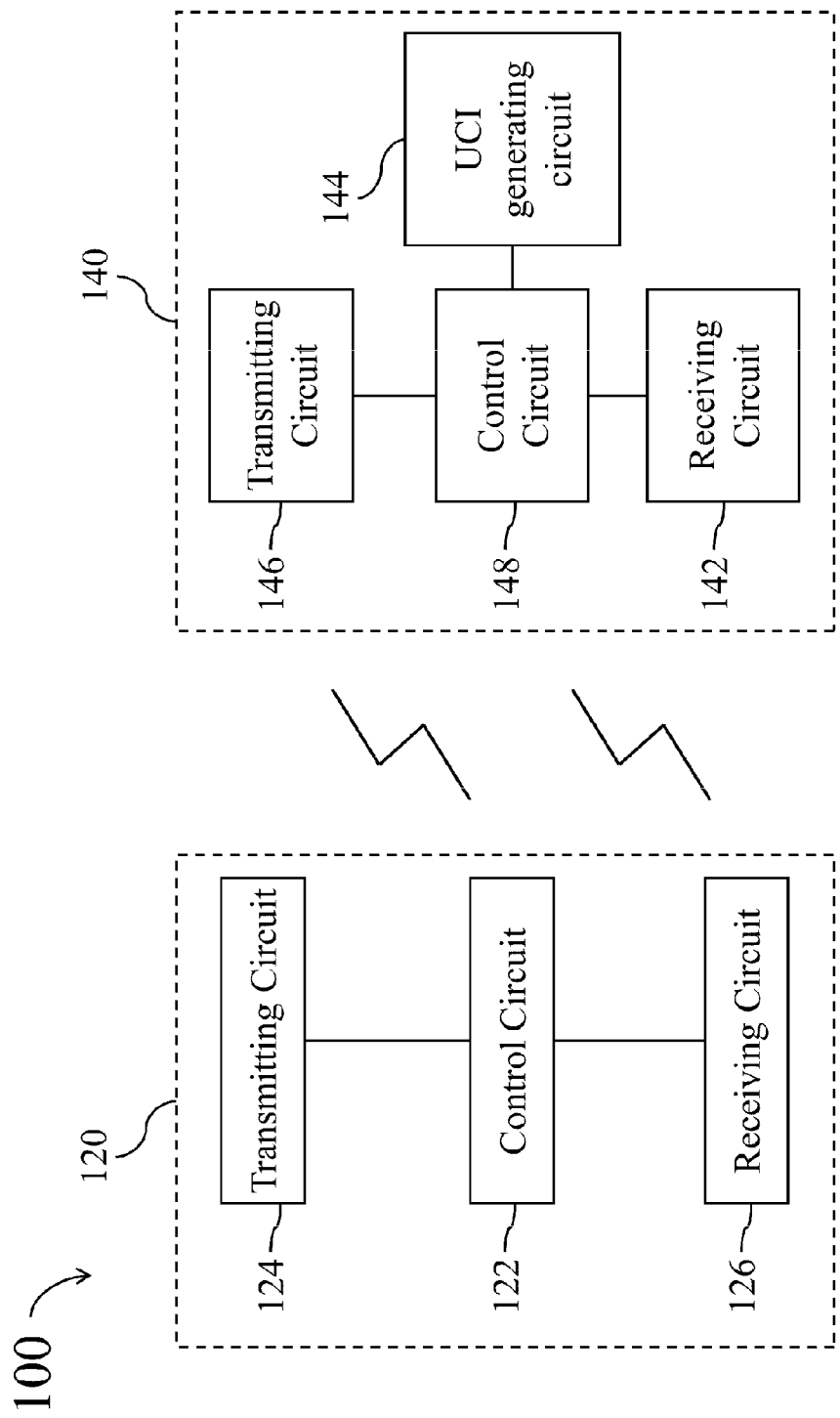
FIG. 1 shows a simplified functional block diagram of a communication system according to one embodiment of the present disclosure.

FIG. 1 shows a simplified functional block diagram of a communication system 100 according to one embodiment of the present disclosure.

The communication system 100 comprises a communication station 120 and a communication device 140. For the purposes of conciseness and clear explanation, other components of the communication system 100 are not shown in FIG. 1.

The communication station 120 comprises a control circuit 122, a transmitting circuit 124 and a receiving circuit 126.

The control circuit 122 is configured to operably generate one or more uplink-downlink (UL-DL) reconfiguration messages for configuring the UL-DL configuration of the communication device 140.

The transmitting circuit 124 is configured to operably transmit the UL-DL reconfiguration message to the communication device 140.

The receiving circuit 126 is configured to operably receive uplink control information (UCI) transmitted by the communication device 140.

The communication station 120 may be realized with the node B, the evolved node B (eNB), the home node B, the base transceiver station or other suitable base stations. Although the control circuit 122, the transmitting circuit 124 and the receiving circuit 126 are illustrated as separate functional blocks in FIG. 1, these circuits may be respectively realized with one or more circuit elements according to different design considerations. For example, the transmitting circuit 124 and the receiving circuit 126 may be realized in the same integrated circuit package. In other embodiments, one or more functions of the control circuit 122, the transmitting circuit 124 and the receiving circuit 126 may be performed by the signal processor in combination with other circuit elements.

The communication device 140 comprises a receiving circuit 142, an uplink control information generating circuit 144, a transmitting circuit 146 and a control circuit 148.

The receiving circuit 142 is configured to operably receive the UL-DL reconfiguration message from the communication station 120.

The uplink control information generating circuit 144 is configured to operably generate a plurality of UCI.

The transmitting circuit 146 is configured to operably transmit the UCI in a plurality of data frames. Each of the data frames comprises a plurality of subframes.

The control circuit 148 is configured to operably determine the subframes of the data frame to be an uplink (UL) subframe, a downlink (DL) subframe or a special subframe according to the UL-DL reconfiguration message transmitted from the communication station 120.

The uplink subframe is utilized for the communication device 140 to transmit the UL data to the communication station 120. The downlink subframe is utilized for the communication device 140 to receive the DL data from the communication station 120. The special subframe is positioned between the downlink subframe and the uplink subframe. A first partition of the special subframe may be utilized to transmit the downlink control information. The second partition of the special subframe is utilized as a guard period reserved for switching from the downlink subframe to the uplink subframe. The last partition of the special subframe may be utilized for the communication device 140 to transmit the UCI, e.g., the SRS.

The communication device 140 may be realized with mobile phones, tablet computers, suitable mobile devices or other user equipment (UE). Although the receiving circuit 142, the uplink control information generating circuit 144, the transmitting circuit 146 and the control circuit 148 are illustrated as separate functional blocks in FIG. 1, these circuits may be respectively realized with one or more circuit elements according to different design considerations. For example, the receiving circuit 142 and the transmitting circuit 146 and may be realized in the same integrated circuit package. In other embodiments, one or more functions of the receiving circuit 142, the uplink control information generating circuit 144, the transmitting circuit 146 and the control circuit 148 may be performed by the signal processor in combination with other circuit elements.

The communication device 140 may transmit several types of UCI for different purposes. For example, the UCI may comprise the CSI, the SRS, the SR and the hybrid automatic repeat request acknowledgement (HARQ-ACK). There may be multiple types of CSI, e.g., the wideband channel quality indicator (WB CQI), the subband CQI (SB CQI), the rank indicator (RI), and the precoding matrix indicator (PMI). The WB CQI is utilized to indicate the channel status of a wider bandwidth of the communication channel. The SB CQI is utilized to indicate the channel status of a specific bandwidth part (BP) of the wider bandwidth of the communication channel.

Moreover, the communication device 140 may be configured to periodically transmit the CSI to the communication station 120 according to several CSI reporting modes. For example, in the 3GPP communication system, the communication device 140 may be configured to transmit the WB CQI in a CSI reporting mode 1-0; transmit the RI, the WB CQI and the PMI in a CSI reporting mode 1-1; transmit the WB CQI, the UE selected SB CQI in a CSI reporting mode 2-0; and transmit the RI, the WB CQI, the UE selected SB CQI and the PMI in a CSI reporting mode 2-1.

FIG. 2 shows a simplified schematic of the UL-DL resource assignments in different UL-DL configurations according to one embodiment of the present disclosure.

In this embodiment, a data frame comprises ten subframes and each subframe may be configured to be the uplink subframe (denoted as U in FIG. 2), the downlink subframe (denoted as D in FIG. 2) or the special subframe (denoted as S in FIG. 2). The communication station 120 may configure the communication device 140 to perform communication in the suitable UL-DL configuration by utilizing the UL-DL reconfiguration message. Thus, the communication device 140 may communicate with the communication station 120 in the appropriate UL-DL configurations.

Moreover, multiple measurement sets of CSI may be configured for measuring the channel status according to the types of the subframes in the UL-DL configurations. For example, a first measurement set may be configured to be the subframes 0, 1, 5 and 6. A second measurement set may be configured to be the subframes 3, 4, 7, 8 and 9. By configuring multiple measurement sets, the communication device 140 may transmit CSI in a more flexibly manner in some UL-DL configurations.

For example, in 3GPP LTE system, the communication device 140 may obtain the UL HARQ reference UL-DL configuration and the DL HARQ reference UL-DL configuration from the higher layer signaling of the communication station 120, e.g., the RRC configuration message. The communication device 140 may therefore obtain the valid UL-DL configurations in reconfiguration downlink control information (DCI), i.e., the UL-DL reconfiguration message. Compared with the time (640 ms or longer) for changing the UL-DL configuration of the legacy UE according to the System Information Block Type 1, the UL-DL reconfiguration message may change the UL-DL configuration in a shorter time (e.g., 10 ms, 20, ms, 40 ms and 80 ms).

FIG. 3 shows a simplified schematic of valid UL-DL configurations in reconfiguration DCI according to one embodiment of the present disclosure. Thus, in certain period of time, the communication station 120 may configure the communication device 140 to perform the communication by utilizing the valid UL-DL configurations. For example, the communication station 120 may configure the communication device 140 to perform the communication by utilizing the valid UL-DL configurations 0-6 in a certain period of time. In another embodiment, the communication station 120 may configure the communication device 140 to perform the communication by utilizing the valid UL-DL configurations 0, 1, 2 and 6 in a certain period of time.

Moreover, the communication station 120 may configure the communication device 140 to perform the communication by utilizing part of the valid UL-DL configurations in a certain period of time, e.g., utilizing the predetermined UL-DL configurations 0, 1, 6 of the valid UL-DL configurations 0, 1, 2, 6 in a certain period of time. The predetermined UL-DL configurations may be predefined or configured by higher layer signaling from the communication station 120.

FIG. 4 shows a simplified schematic of the UCI transmission according to one embodiment of the present disclosure.

When the communication device 140 drops the CSI, the system performance may be influenced. In this embodiment, to minimize the situation that the CSI is dropped, the communication station 120 and the communication device 140 are configured to perform the periodic CSI reporting in the same subframe(s) of the data frames which is not configured to be the downlink subframe in the valid UL-DL configurations. In the embodiment in FIG. 4, the valid UL-DL configurations are configured to be the UL-DL configurations 0-6. In view of the embodiment in FIG. 2, the subframe 2 is not configured to be the downlink subframe in the valid UL-DL configurations. In this embodiment, the communication station 120 and the communication device 140 perform a first UCI report configuration and the communication device 140 transmits the CSI in subframes 2 in the valid UL-DL configurations.

In frame 400, the communication device 140 transmits the RI of the first measurement set in the subframe 2.

In frame 401, the communication device 140 transmits the WB CQI and the PMI of the first measurement set in the subframe 2.

In frame 402, the communication device 140 transmits the WB CQI and the PMI of the second measurement set in the subframe 2.

In frame 403, the communication device 140 transmits the SB CQI for a first BP of the first measurement set in the subframe 2.

In frame 404, the communication device 140 transmits the SB CQI for a first BP of the second measurement set in the subframe 2.

In frame 405, the communication device 140 transmits the SB CQI for a second BP of the first measurement set in the subframe 2.

In frame 406, the communication device 140 transmits the SB CQI for a second BP of the second measurement set in the subframe 2.

In frame 407, the communication device 140 transmits the SB CQI for a third BP of the first measurement set in the subframe 2.

In frame 408, the communication device 140 transmits the SB CQI for a third BP of the second measurement set in the subframe 2.

In frame 409, the communication device 140 transmits the SB CQI for a fourth BP of the first measurement set in the subframe 2.

In frame 410, the communication device 140 transmits the RI of the second measurement set in the subframe 2. The SB CQI for a fourth BP of the second measurement set, which were to be transmitted in frame 410, is dropped because its priority is lower than the priority of the RI of the second measurement set.

In frame 411, the communication device 140 transmits the WB CQI and the PMI of the first measurement set in the subframe 2.

In frame 412, the communication device 140 transmits the WB CQI and the PMI of the second measurement set in the subframe 2.

In frame 413, the communication device 140 transmits the SB CQI for the first BP of the first measurement set in the subframe 2.

In frame 414, the communication device 140 transmits the SB CQI for the first BP of the second measurement set in the subframe 2.

In frame 415, the communication device 140 transmits the SB CQI for the second BP of the first measurement set in the subframe 2.

In frame 416, the communication device 140 transmits the SB CQI for the second BP of the second measurement set in the subframe 2.

In frame 417, the communication device 140 transmits the SB CQI for the third BP of the first measurement set in the subframe 2.

In frame 418, the communication device 140 transmits the SB CQI for the third BP of the second measurement set in the subframe 2.

In frame 419, the communication device 140 transmits the SB CQI for the fourth BP of the first measurement set in the subframe 2.

In frame 420, the communication device 140 transmits the RI of the first measurement set in the subframe 2. The SB CQI for the fourth BP of the second measurement set is again dropped because its priority is lower than the priority of the RI of the first measurement set.

By utilizing the first UCI report configuration, the communication station 120 and the communication device 140 may perform the required periodic CSI reporting in the subframes of the data frames, which are not configured to be the downlink subframe in the valid UL-DL configurations.

Figure 5:
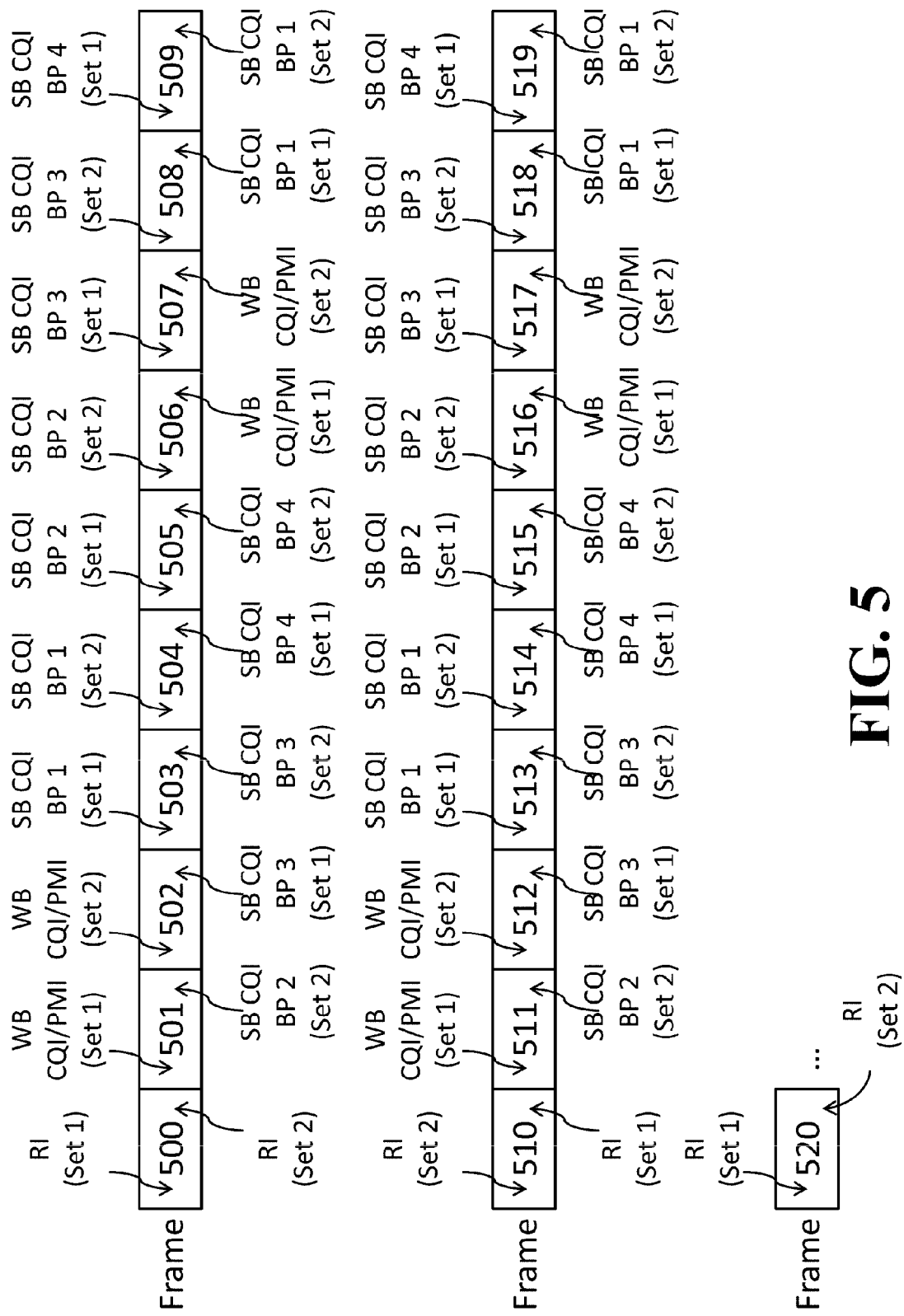
FIG. 5 shows a simplified schematic of the UCI transmission according to another embodiment of the present disclosure.

FIG. 5 shows a simplified schematic of the UCI transmission according to one embodiment of the present disclosure.

In addition to the first UCI report configuration, additional UCI report configuration may be performed by the communication station 120 and the communication device 140 for transmitting more CSI with a shorter update period.

For example, when the communication station 120 and the communication device 140 are communicating by utilizing one or more predetermined UL-DL configurations of the valid UL-DL configurations, additional UCI may be transmitted in the subframe(s), which is not configured to be the downlink subframe in the predetermined UL-DL configurations, in addition to the UCI transmitted in the first UCI report configuration.

In this embodiment, the valid UL-DL configurations are configured to be the UL-DL configurations 0-6 and the predetermined UL-DL configurations are configured to be the UL-DL configurations 0, 1, 2 and 6. Therefore, when the communication station 120 and the communication device 140 are communicating in the predetermined UL-DL configurations, the CSI may be additionally transmitted in the subframes 7 which are configured to be the uplink subframe in the predetermined UL-DL configurations 0, 1, 2 and 6. The CSI additionally transmitted in the subframes 7 of the data frames may be transmitted with a predetermined time shift with respect to the CSI transmitted in the subframes 2 of the data frames to shorten the updated period of the CSI. For example, the communication device 140 may periodically transmit at least part of the CSI with substantially the same sequence and a predetermined time shift respectively in the subframes 2 and 7 of the data frames. Moreover, some CSI may be dropped because of the different priorities of the CSI.

For example, in the embodiment in FIG. 5, substantially the same sequence of the CSI, i.e., the WB CQI and the PMI of the first measurement set, the WB CQI and the PMI of the second measurement, the SB CQI for a first BP of the first measurement set, the SB CQI for the first BP of the second measurement set, the SB CQI for the second BP of the first measurement set, the SB CQI for the second BP of the second measurement set, the SB CQI for the third BP of the first measurement set, the SB CQI for the third BP of the second measurement set, the SB CQI for the fourth BP of the first measurement set, are transmitted respectively in the subframes 2 of the data frames 501-509 and in the subframes 7 of the data frames 506-514 with a predetermined time shift of five data frames (more precisely 55 subframes). The SB CQI for the second BP of the first measurement set is dropped in data frames 510 because its priority is lower than the priority of the RI. Moreover, the RI of the first measurement set are transmitted respectively in the subframe 2 of the data frame 500 and the subframe 7 of the data frame 510. The RI of the second measurement set are transmitted respectively in the subframe 7 of the data frame 500 and the subframe 2 of the data frame 510. Therefore, the updated period of the WB CQI, the SBCQI and the RI in the embodiment in FIG. 5 are shortened in comparison with the embodiment in FIG. 4.

In frame 500, the communication device 140 transmits the RI of the first measurement set in the subframe 2 and the RI of the second measurement set in the subframe 7.

In frame 501, the communication device 140 transmits the WB CQI and the PMI of the first measurement set in the subframe 2 and the SB CQI for the second BP of the second measurement set in subframe 7.

In frame 502, the communication device 140 transmits the WB CQI and the PMI of the second measurement set in the subframe 2 and the SB CQI for the third BP of the first measurement set in subframe 7.

In frame 503, the communication device 140 transmits the SB CQI for the first BP of the first measurement set in the subframe 2 and the SB CQI for the third BP of the second measurement set in subframe 7.

In frame 504, the communication device 140 transmits the SB CQI for the first BP of the second measurement set in the subframe 2 and the SB CQI for the fourth BP of the first measurement set in subframe 7.

In frame 505, the communication device 140 transmits of the SB CQI for the second BP the first measurement set in the subframe 2 and the SB CQI for the fourth BP of the second measurement set in subframe 7.

In frame 506, the communication device 140 transmits the SB CQI for the second BP of the second measurement set in the subframe 2 and the WB CQI and the PMI of the first measurement set in subframe 7.

In frame 507, the communication device 140 transmits the SB CQI for the third BP of the first measurement set in the subframe 2 and the WB CQI and the PMI of the second measurement set in subframe 7.

In frame 508, the communication device 140 transmits the SB CQI for the third BP of the second measurement set in the subframe 2 and the SB CQI for the first BP of the first measurement set in subframe 7.

In frame 509, the communication device 140 transmits the SB CQI for the fourth BP of the first measurement set in the subframe 2 and the SB CQI for the first BP of the second measurement set in subframe 7.

In frame 510, the communication device 140 transmits the RI of the second measurement set in the subframe 2 and the RI of the first measurement set in the subframe 7. The SB CQI for the fourth BP of the second measurement set and the SB CQI for the second BP of the first measurement set are dropped because their priority are lower than the priority of the RI.

In frame 511, the communication device 140 transmits the WB CQI and the PMI of the first measurement set in the subframe 2 and the SB CQI for the second BP of the second measurement set in subframe 7.

In frame 512, the communication device 140 transmits the WB CQI and the PMI of the second measurement set in the subframe 2 and the SB CQI for the third BP of the first measurement set in subframe 7.

In frame 513, the communication device 140 transmits the SB CQI for the first BP of the first measurement set in the subframe 2 and the SB CQI for third BP of the second measurement set in subframe 7.

In frame 514, the communication device 140 transmits the SB CQI for the first BP of the second measurement set in the subframe 2 and the SB CQI for the fourth BP of the first measurement set in subframe 7.

In frame 515, the communication device 140 transmits the SB CQI for the second BP of the first measurement set in the subframe 2 and the SB CQI for the fourth BP of the second measurement set in subframe 7.

In frame 516, the communication device 140 transmits the SB CQI for the second BP of the second measurement set in the subframe 2 and the WB CQI and the PMI of the first measurement set in subframe 7.

In frame 517, the communication device 140 transmits the SB CQI for the third BP of the first measurement set in the subframe 2 and the WB CQI and the PMI of the second measurement set in subframe 7.

In frame 518, the communication device 140 transmits the SB CQI for the third BP of the second measurement set in the subframe 2 and the SB CQI for the first BP of the first measurement set in subframe 7.

In frame 519, the communication device 140 transmits the SB CQI for the fourth BP of the first measurement set in the subframe 2 and the SB CQI for the first BP of the second measurement set in subframe 7.

In frame 520, the communication device 140 transmits the RI of the first measurement set in the subframe 2 and the RI of the second measurement set in the subframe 7. The SB CQI for the fourth BP of the second measurement set and the SB CQI for the second BP of the first measurement set are dropped because their priority are lower than the priority of the RI.

By utilizing both the first UCI report configuration and the additional UCI report configuration, the communication station 120 and the communication device 140 may not only perform the required periodic CSI reporting but also shorten the CSI update period. For example, the update period of the RI has been shortened from 20 data frames to 10 data frames, and the update period of the WB CQI and the SB CQI has been shortened from 10 data frames to 5 data frames. Therefore, the communication station 120 and the communication device 140 may have better understanding about the instant channel status.

Figure 6:
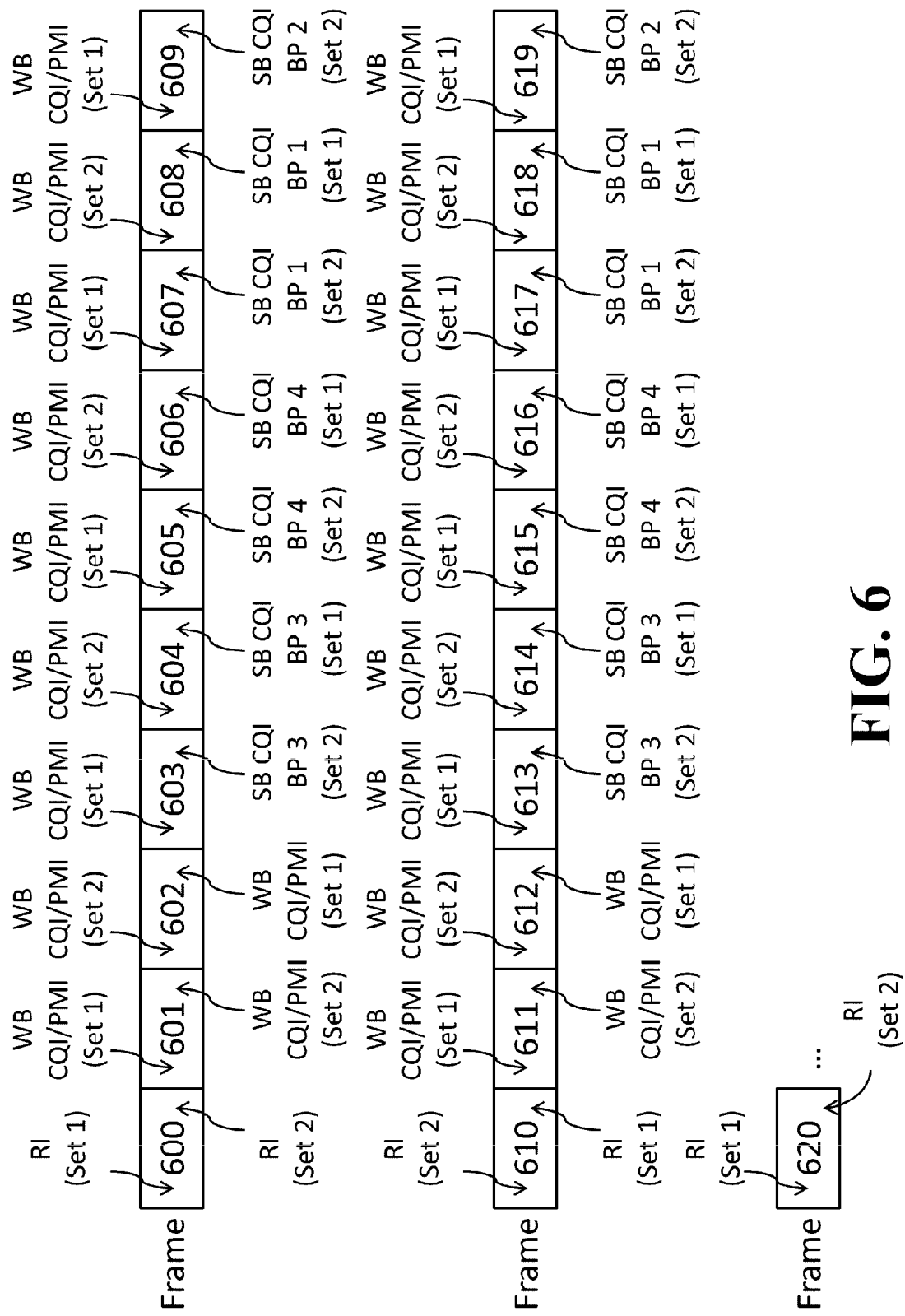
FIG. 6 shows a simplified schematic of the UCI transmission according to another embodiment of the present disclosure.

FIG. 6 shows a simplified schematic of the UCI transmission according to another embodiment of the present disclosure.

The additional UCI report configuration may also be configured to transmit the UCI in other suitable manners. For example, in the embodiment in FIG. 6, the valid UL-DL configurations are configured to be the UL-DL configurations 0-6 and the predetermined UL-DL configurations are configured to be the UL-DL configurations 0, 1, 2 and 6. Therefore, when the communication station 120 and the communication device 140 are communicating in the predetermined UL-DL configurations, the UCI may be additionally transmitted in the subframes 7 which are configured to be the uplink subframe in the predetermined UL-DL configurations. Moreover, the communication device 140 transmits the UCI in subframes 2 of the data frames according to the CSI reporting mode 1-1 and transmits the UCI in subframes 7 of the data frames according to the CSI reporting mode 2-1.

As shown in FIG. 6, when the communication station 120 and the communication device 140 are communicating in the predetermined UL-DL configurations, the communication device 140 transmits the RI, the WB CQI and the PMI according to the CSI reporting mode 1-1 in subframes 2 of the data frames and transmits the RI, the SB CQI and the PMI according to the CSI reporting mode 2-1 in subframes 7 of the data frames.

In other embodiments, the valid UL-DL configurations are configured to be the UL-DL configurations 0-6 and the predetermined UL-DL configurations are configured to be the UL-DL configurations 0, 1, 2 and 6. Therefore, when the communication station 120 and the communication device 140 are communicating in the predetermined UL-DL configurations, the CSI may be additionally transmitted in the subframes 7 which are configured to be the uplink subframe in the predetermined UL-DL configurations. Moreover, the communication device 140 transmits the CSI in subframes 2 of the data frames according to the CSI reporting mode 1-1 and transmits the CSI designated according any suitable selection rule in subframes 7 of the data frames. For example, the designated CSI transmitted in the subframes 7 of the data frames may be configured to be the designated SB CQI for each bandwidth parts, the designated SB CQI for specific bandwidth part(s), the designated WB CQI, etc.

In other embodiments, the communication device 140 may report other types of UCI according to the UCI report configurations described in the embodiments above. For example, the valid UL-DL configurations are configured to be the UL-DL configurations 0, 1, 2 and 6, and the predetermined UL-DL configurations are configured to be the UL-DL configurations 0, 1 and 6. The communication device 140 may transmit the SR in the subframes 2 of the data frames in the valid UL-DL configurations 0, 1, 2 and 6. Moreover, additional SR may be transmitted in the subframes 8 of the data frames which are configured to be the uplink subframe in the predetermined UL-DL configurations 0, 1 and 6.

Figure 7:
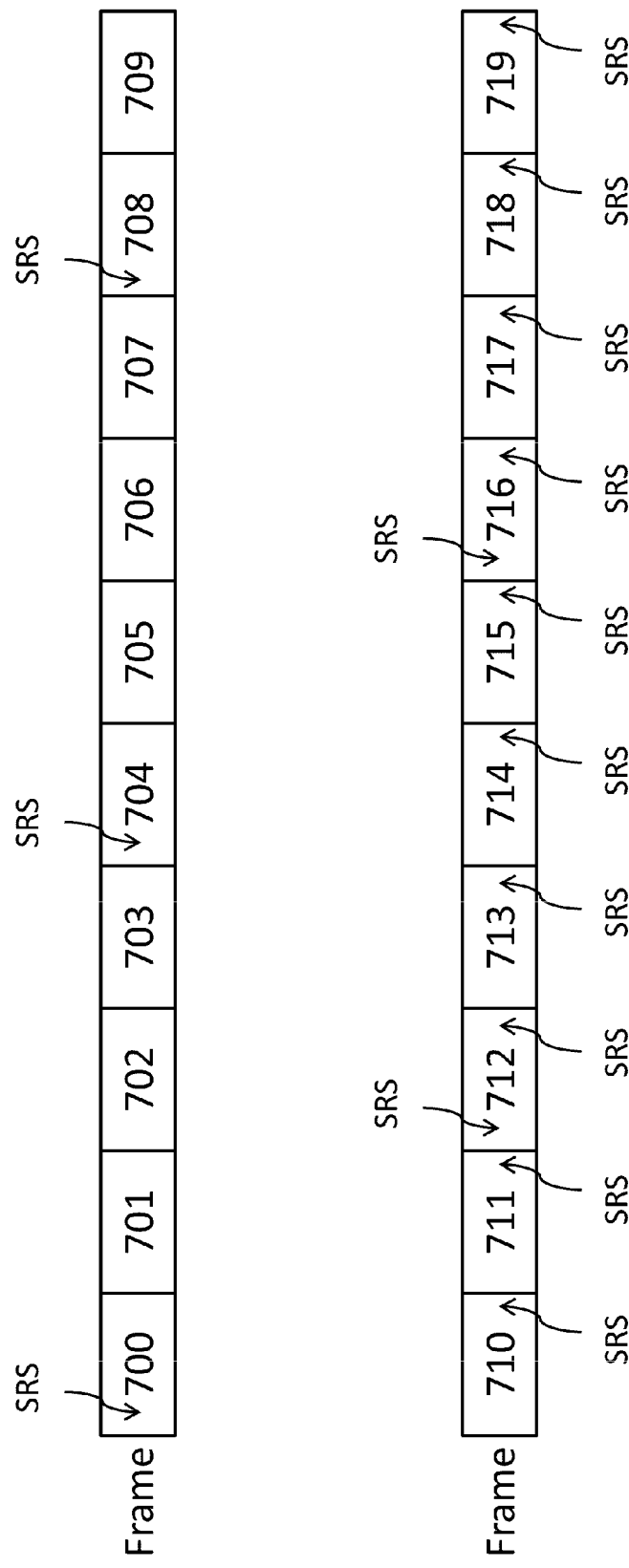
FIG. 7 shows a simplified schematic of the UCI transmission according to another embodiment of the present disclosure.

FIG. 7 shows a simplified schematic of the UCI transmission according to another embodiment of the present disclosure.

Because the UCI have different priority and the uplink resource is limited, the lower priority UCI may often be dropped. In this embodiment, further to the first UCI report configuration, an additional UCI report configuration may be performed by the communication station 120 and the communication device 140 to transmit the lower priority UCI, e.g., the SRS.

In this embodiment, the SRS is configured to be periodically transmitted in the same subframe(s) of the data frames which is not configured to be the downlink subframe in the valid UL-DL configurations 0-6. In view of the embodiment in FIG. 2, the subframe 1 is not configured to be the downlink subframe in the valid UL-DL configurations 0-6. In this embodiment, the communication device 140 periodically transmits the SRS in subframes 1 of the data frames to the communication station 120 in the valid UL-DL configurations 0-6.

Moreover, when the communication station 120 and the communication device 140 are communicating in the predetermined UL-DL configurations 0, 1 and 6, the UCI may be additionally transmitted in the subframe 8 which is configured to be the uplink subframe in the predetermined UL-DL configurations 0, 1 and 6.

As shown in FIG. 7, when the communication device 140 transmits the data frames 700-709 by utilizing the UL-DL configurations 2, 3, 4 and 5, the SRS is transmitted in the subframe 1 of every fourth data frame. When the communication device 140 transmits the data frames 710-719 by utilizing the UL-DL configurations 0, 1 and 6, the SRS is transmitted not only on the subframe 1 of every fourth data frame but also in the subframe 8 of every data frames. Therefore, more SRS may be transmitted in the predetermined UL-DL configurations 0, 1 and 6 and a better system performance may be achieved.

In the embodiments above, the subframe 2 of the data frame is always configured to be the uplink subframe and the subframe 8 may be configured to be either uplink subframe or downlink subframe in the valid UL-DL configuration. When the communication station 120 estimates the UL channel status by utilizing the SRS transmitted in the subframe 2, the estimation might not be accurate for the channel status of the subframe 8 because there might be interferences in the channel of the subframe 8 from the DL signals of other communication stations. By utilizing the SRS transmitted in the subframes 2 and 8 for estimating the UL channel status, the communication station 120 may have a better understanding about the communication channels and obtain a better resource scheduling performance.

Compared with changing the UL-DL configuration of the communication device with the System Information Block Type 1 (SIB1), the UL-DL reconfiguration message may change the UL-DL configuration of the communication device in a shorter period. The communication system may therefore more adapt to the rapid varying communication channels. Moreover, the UCI reporting configuration may be simplified when communicating in the valid UL-DL configuration and in the predetermined UL-DL configuration.

In the above embodiments, the UCI reporting configuration may be easily implemented for reporting the CSI, SR and/or SRS in all the valid UL-DL configurations and the predetermined UL-DL configurations in FIG. 2. The communication device may transmit the UCI more flexibly according to the valid UL-DL configurations and the predetermined UL-DL configurations, and provide additional UCI to the communication station for improving system performance.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Throughout the description and claims, the term "element" contains the concept of component, layer, or region.

In the drawings, the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A communication device, comprising:
   a receiving circuit configured to operably receive an uplink-downlink (UL-DL) reconfiguration message from a communication station;
   an uplink control information generating circuit configured to operably generate a plurality of uplink control information (UCI);
   a transmitting circuit configured to operably transmit the UCI in a plurality of data frames, wherein each of the data frames comprises a plurality of subframes; and
   a control circuit configured to operably determine the subframe of the data frame to be an uplink subframe, a downlink subframe or a special subframe according to the UL-DL reconfiguration message;
   wherein the UL-DL reconfiguration message configures the communication device to operate in one of a plurality of valid UL-DL configurations; a first subframe of the subframes of the data frame is not configured to be the downlink subframe in the valid UL-DL configurations; and the control circuit configures the transmitting circuit to transmit the UCI in the first subframes of the data frames.

2. The communication device of claim 1, wherein when the UL-DL reconfiguration message configures the communication device to operate in one or more predetermined UL-DL configurations of the valid UL-DL configurations, the control circuit further configures the transmitting circuit to transmit the UCI in a second subframe of the data frame in the predetermined UL-DL configurations; and the second subframe of the data frame is not configured to be the downlink subframe in the predetermined UL-DL configurations.

3. The communication device of claim 2, wherein the UCI comprise multiple types of channel state information (CSI), and the control circuit configures the transmitting circuit to transmit at least part of the CSI with substantially a same sequence and a predetermined time shift respectively in the first subframes of the data frames and in the second subframes of the data frames in the predetermined UL-DL configurations.

4. The communication device of claim 2, wherein the UCI comprise multiple types of channel state information (CSI); and the control circuit configures the transmitting circuit to transmit the CSI according to a first CSI reporting mode in the first subframes of the data frames and transmit the CSI according to a second CSI reporting mode in the second subframes of the data frames in the predetermined UL-DL configurations.

5. The communication device of claim 2, wherein the UCI comprise multiple types of channel state information (CSI); and the control circuit configures the transmitting circuit to transmit the CSI according to a first CSI reporting mode in the first subframes of the data frames and transmit one of a designated wideband CSI and a designated subband CSI in the second subframes of the data frames in the predetermined UL-DL configurations.

6. The communication device of claim 2, wherein the control circuit configures the transmitting circuit to transmit the UCI in a periodical manner respectively in the first subframes of the data frames and in the second subframes of the data frames in the predetermined UL-DL configurations.

7. The communication device of claim 1, wherein the UCI comprise one or more channel state information, the scheduling request and the sounding reference signal.

8. A communication station, configured to operably communicate with a communication device, comprising:
   a control circuit configured to operably generate an uplink-downlink (UL-DL) reconfiguration message for configuring a UL-DL configuration of the communication device;

a transmitting circuit configured to operably transmit the UL-DL reconfiguration message to the communication device; and a receiving circuit configured to operably receive uplink control information (UCI) transmitted by the communication device;

wherein the UCI is transmitted in a plurality of data frames and each of the data frames comprises a plurality of subframes; the subframe of the data frame is configured to be an uplink subframe, a downlink subframe or a special subframe according to the UL-DL reconfiguration message; the UL-DL reconfiguration message configures the communication device to operate in one of a plurality of valid UL-DL configurations; a first subframe of the subframes of the data frame is not configured to be the downlink subframe in the valid UL-DL configurations; and the receiving circuit receives the UCI in the first subframes of the data frames.

9. The communication station of claim 8, wherein when the UL-DL reconfiguration message configures the communication device to operate in one or more predetermined UL-DL configurations of the valid UL-DL configurations, the receiving circuit further receives the UCI in a second subframe of the data frame in the predetermined UL-DL configurations; and the second subframe of the data frame is not configured to be the downlink subframe in the predetermined UL-DL configurations.

10. The communication station of claim 9, wherein the UCI comprise multiple types of channel state information (CSI), and the receiving circuit receives at least part of the CSI with substantially a same sequence and a predetermined time shift respectively in the first subframes of the data frames and in the second subframes of the data frames in the predetermined UL-DL configurations.

11. The communication station of claim 9, wherein the UCI comprise multiple types of channel state information (CSI); and the receiving circuit receives the CSI according to a first CSI reporting mode in the first subframes of the data frames and receives the CSI according to a second CSI reporting mode in the second subframes of the data frames in the predetermined UL-DL configurations.

12. The communication station of claim 9, wherein the UCI comprise multiple types of channel state information (CSI); and the receiving circuit receives the CSI according to a first CSI reporting mode in the first subframes of the data frames and receives one of a designated wideband CSI and a designated subband CSI in the second subframes of the data frames in the predetermined UL-DL configurations.

13. The communication station of claim 9, wherein the receiving circuit receives the UCI in a periodical manner respectively in the first subframes of the data frames and in the second subframes of the data frames in the predetermined UL-DL configurations.

14. The communication station of claim 8, wherein the UCI comprise one or more channel state information, the scheduling request and the sounding reference signal.

* * * * *